(12) United States Patent
Tüllmann et al.

(10) Patent No.: US 8,740,761 B2
(45) Date of Patent: Jun. 3, 2014

(54) TOOL CHAIN MAGAZINE

(75) Inventors: Udo Tüllmann, Eisenach (DE); Stephan Kümmel, Falkenstein/Harz (DE); Andreas Kretzschmar, Cunewalde (DE)

(73) Assignee: Deckel Maho Seebach GmbH, Seebach (DE)

( * ) Notice: Subject to any disclaimer, the term of this patent is extended or adjusted under 35 U.S.C. 154(b) by 861 days.

(21) Appl. No.: 12/898,189

(22) Filed: Oct. 5, 2010

(65) Prior Publication Data

US 2011/0251035 A1 Oct. 13, 2011

(30) Foreign Application Priority Data

Oct. 7, 2009 (DE) .......................... 10 2009 048 343

(51) Int. Cl.
*B23Q 3/157* (2006.01)
*B23Q 3/155* (2006.01)
*B65G 1/12* (2006.01)

(52) U.S. Cl.
CPC .......... *B23Q 3/15526* (2013.01); *B23Q 3/1572* (2013.01); *B65G 1/12* (2013.01)
USPC .......................................... 483/68; 211/1.56

(58) Field of Classification Search
CPC ............. B23Q 3/1572; B23Q 3/15726; B23Q 3/1574; B23Q 3/15753; B23Q 3/15766
USPC ..................................... 483/68, 66; 211/1.56
See application file for complete search history.

(56) References Cited

U.S. PATENT DOCUMENTS

| | | | |
|---|---|---|---|
| 3,817,541 A * | 6/1974 | Grabher et al. | ............... 279/156 |
| 4,182,021 A * | 1/1980 | Kato et al. | ..................... 483/68 |
| 4,541,533 A | 9/1985 | Uemura | |
| 4,699,276 A | 10/1987 | Kis | |
| 4,858,980 A * | 8/1989 | Dreisig et al. | .................. 483/68 |
| 6,428,454 B1 | 8/2002 | Yokota et al. | |
| 7,094,190 B2 * | 8/2006 | Sakuragi | ......................... 483/65 |
| 7,104,941 B2 * | 9/2006 | Sakuragi et al. | ................ 483/68 |

FOREIGN PATENT DOCUMENTS

| | | |
|---|---|---|
| CN | 201056706 Y | 5/2008 |
| DE | 1882320 U | 11/1963 |
| DE | 8701368.1 U1 | 3/1987 |
| DE | 19609145 A1 | 9/1997 |

(Continued)

OTHER PUBLICATIONS

Machine Translation of JP 2002-273633, which JP '633 was published Sep. 2002.*

(Continued)

*Primary Examiner* — Erica E Cadugan

(74) *Attorney, Agent, or Firm* — The Maxham Firm

(57) ABSTRACT

A tool chain magazine, in particular for program-controlled milling machines and machining centers, comprising a stationary supporting structure to which linear guiding devices, chain wheels, and a drive assembly as a rotary drive for at least one of the chain wheels are mounted. The tool chain comprises an endless magazine chain consisting of a series of chain links connected in an articulate manner to one another, wherein supporting and guiding elements are provided on each chain link, and each chain link has a respective socket as a holder for a tool taper. The base bodies of the chain links of the magazine chain are formed by the tool stations centrally disposed therein, and the front and rear connecting joints of the chain links are arranged in the longitudinal center axis of the magazine chain.

16 Claims, 4 Drawing Sheets

(56) References Cited

FOREIGN PATENT DOCUMENTS

| | | | |
|---|---|---|---|
| DE | 102005026172 A1 | | 3/2006 |
| JP | 57127642 A | | 8/1982 |
| JP | 58-059742 A | * | 4/1983 |
| JP | 61071938 A | | 4/1986 |
| JP | 62-044334 A | * | 2/1987 |
| JP | 2002273633 A | | 9/2002 |
| JP | 2004-001155 A | * | 1/2004 |
| SU | 1648727 A1 | | 5/1991 |

OTHER PUBLICATIONS

Machine Translation of JP 2004-001155, which JP '155 was published Jan. 2004.*
Official Action from German Patent Office, 4 pages (Sep. 27, 2010).
Official Action from European Patent Office, 4 pages (Aug. 5, 2013).
European Search Report EP2308637A3, 5 pages (Jun. 29, 2011).
Chinese Official Action dated Nov. 4, 2013, in Chinese and an English translation.

* cited by examiner

TOOL CHAIN MAGAZINE

FIELD OF THE INVENTION

The invention embodiments disclosed relate generally to a tool chain magazine, in particular for program-controlled milling machines and machining centers, comprising a stationary supporting structure to which linear guiding devices, chain wheels and a drive assembly as a rotary drive for at least one of the chain wheels are mounted, and comprising an endless magazine chain that consists of a series of chain links connected in an articulate manner to one another, each chain link being held and guided on the linear supporting and guiding members and having a respective socket as a holder for a machining tool.

BACKGROUND

Tool chain magazines for complex milling machines and machining centers have been known for some time in various embodiments. Basically, they consist of a stable supporting structure that may be mounted to a suitable location of the machine frame or positioned adjacent to the machine frame as a separate constructional unit. Depending on the size and layout of the chain magazine, a driving chain wheel and one or more deflection chain wheels are disposed in this supporting structure, the driving chain wheel being connected to a motor as a rotary drive. An endless link chain is guided around the chain wheels. The chain links are connected by suitable joints so that they can swivel with one another. Each joint contains a holder for a tool. In conventional chain magazines, these holders are usually formed like pincers, wherein mostly spring-biased mechanisms are operated for inserting and removing the respective tools.

Apart from that, tool chain magazines are already known whose chain links for the most part consist of cast steel or the like. Each chain link of the magazine chain has a socket or quiver for a tool, the interior of which is adapted to the outer contour of the tool taper to be accommodated by labor-intensive machining so that it is possible to insert such tool taper into the socket in an accurately fitting manner, fix it therein by a spring lock and also remove it therefrom. However, as the socket-like tool holding fixtures are provided at the sides of the chain links, considerable loads result, particularly in case of fast chain movements. Further, the manufacturing of such magazine chains involves high labor and cost efforts which i.a. are caused by the necessary fine finishing of the chain link blanks.

SUMMARY OF EMBODIMENTS OF THE INVENTION

It is a purpose of embodiments of the invention to provide a tool chain magazine, in particular for program-controlled milling machines and machining centers, that is exposed to controllable loads, even in case of high accelerations and speeds, and can be manufactured and operated with high economic efficiency in a cost-saving manner.

This function can be achieved in accordance with embodiments of the invention by a tool chain magazine, in particular for program-controlled milling machines and machining centers, by the fact that the chain links of the magazine chain are formed by the sockets and the front and rear connecting joints of the chain links are respectively disposed in the longitudinal center axis of the magazine chain.

According to embodiments of the invention, the chain links of the magazine chain are formed such that the sockets form the central integral base body of each chain link and the center axis of each socket is in the vertical longitudinal plane of the chain link, in the direction of movement, which results in a symmetrical structure of the chain link. The arrangement, in the direction of movement, of the front and rear connecting joints on the chain links in the longitudinal center axis and the vertical center plane, respectively, of the magazine chain effects a symmetrical distribution of the acting tensile forces, whereby loads, in particular transverse loads and moments of tilt, are minimized. The central arrangement of the sockets in the respective chain link also results in geometrically and kinematically favorable symmetrical proportions.

According to a particularly advantageous embodiment of the chain magazine according to embodiments of the invention, the chain links each are formed as integral molded bodies from a dimensionally stable and wear-resistant material, in particular a light metal, high tensile plastic, or an optionally fiber-reinforced plastic material, for example. This results in advantages with respect to the manufacturing technique because the molded bodies can be produced by suitable casting or injection molding techniques without any machining. Apart from that, the use of light metal or high-tensile plastic materials as a material for the chain links leads to low weights of the magazine chains, which makes it possible to correspondingly design the supporting structure and the motor-driven drive assemblies. Thus, in addition to the favorable manufacturing costs due to the omission of complicated machining operations of the chain links, longer operational times result from the reduction of the acceleration and deceleration loads by the lower overall weights. A particular feature of the invention consists in the fact that no machining finishing works have to be carried out on the sockets, which leads to a simplified manufacture and a particularly favorable cost condition. The possibility to use high-tensile plastic materials is an advantage that leads to reduced weights and operational noise of the inventive chain magazine.

In an embodiment according to another advantageous design of the invention, in order to guarantee a uniform engagement of the driving chain wheels and also the deflection chain wheels on the individual chain links even after long operating times, each chain link is provided with a reinforced circumferential part of large diameter on which the respective chain wheels engage. This reinforced circumferential part suitably consists of the same material as the base body of the chain link, that is, a light metal cast or high-tensile plastic material, and may be formed in the shape of a plurality of narrow ring segments formed axially on top of one another on the outside of the base body. However, it is also possible to manufacture the reinforced circumferential part of the chain link, on which the chain wheels engage, from a particularly stable and wear-resistant material.

A two-sided symmetrical support of each chain link is of substantial importance for a twist-resistant operational behavior of the magazine chain and the chain links thereof. In order to achieve operationally reliable twist-resistant support and guidance, each chain link in an advantageous embodiment of the inventive chain magazine has two guiding and supporting rollers diametrically arranged at a side which move in two mutually parallel guiding and supporting rails of the supporting structure. These guiding and supporting rollers are fixed and supported on two preferably hollow pins that are laterally molded on the base body of the respective chain link and point to the outside. The central arrangement of the socket in the base body of the chain link and the support of the chain link on both outside running rollers in turn yield favorable symmetrical proportions.

The articulated connection of the successive chain links to the magazine chain is made by joint bolts that enable swiveling movements to both sides so that "counter bendings" with relatively narrow radii of the magazine chain are possible, whereby the required space of the chain magazine for accommodating a larger number of tools may be reduced. Guiding rollers for laterally guiding the magazine chain are suitably supported on the protruding end parts of the joint bolts, which guiding rollers move in corresponding guiding rails of the supporting structure.

In order for the magazine chain to be able to sustain the high acceleration and deceleration forces even after long operating times without getting damaged, the particularly highly stressed connecting joints between the successive chain links are formed so as to be dimensionally rigid and stable. For this purpose, in a preferred embodiment two rod eyes longitudinally extended in a vertical manner are molded on one side of each chain link at an intermediate distance in the vertical center plane. On the diametrically opposed other side of the chain link a central rod eye that is also longitudinally extended is also molded, the length of which is slightly smaller than the axial distance between the two rod eyes of the first side so that this central rod eye fits with play between the two rod eyes of the other chain link and the connecting bolt can be pushed through all three rod eyes and secured. As the central rod eye is exposed to increased loads, short bearing bushes are suitably inserted in the interior thereof. In order to achieve a suitable distribution of the tensile forces acting on the joints during operation via the joint bolts in the individual chain links, it is suitable to form the cylindrical walls of the rod eyes with a transition gradually widening inward in the base body of the chain link. The walls of the rod eyes may also merge into upper or lower reinforcing struts at the inner surface facing the base body of the chain link, which reinforcing struts extend in the direction of the chain path of travel and favor the accommodation and symmetric distribution of the tensile forces occurring during operation.

In order to guarantee safe support of the tool tapers inserted in the respective socket of the chain link, a clip is provided in the upper end part of the base body of the chain link, which in one embodiment has a ball in an integrally molded hollow cylinder and a compression spring radially acting on the ball. The ball is supported in the hollow cylinder so that it can be moved in a longitudinal direction and is pressed by the compression spring into a ring groove at the upper end part of the tool taper in order to secure the latter against falling out. In order to secure the ball lock a spring buckle or torque control spring is clamped onto the upper part of the base body of the chain link.

A subject-matter of the invention is also a magazine chain for a chain magazine in which the sockets for the tools are connected by the joint bolts of the joints alone to form a magazine chain while omitting a machining operation.

BRIEF DESCRIPTION OF THE DRAWING

The invention is further described below by means of the subsequent detailed description of advantageous embodiments of the invention, reference being made to the accompanying drawing, wherein.

DETAILED DESCRIPTION OF EMBODIMENTS OF THE INVENTION

Figure 1:
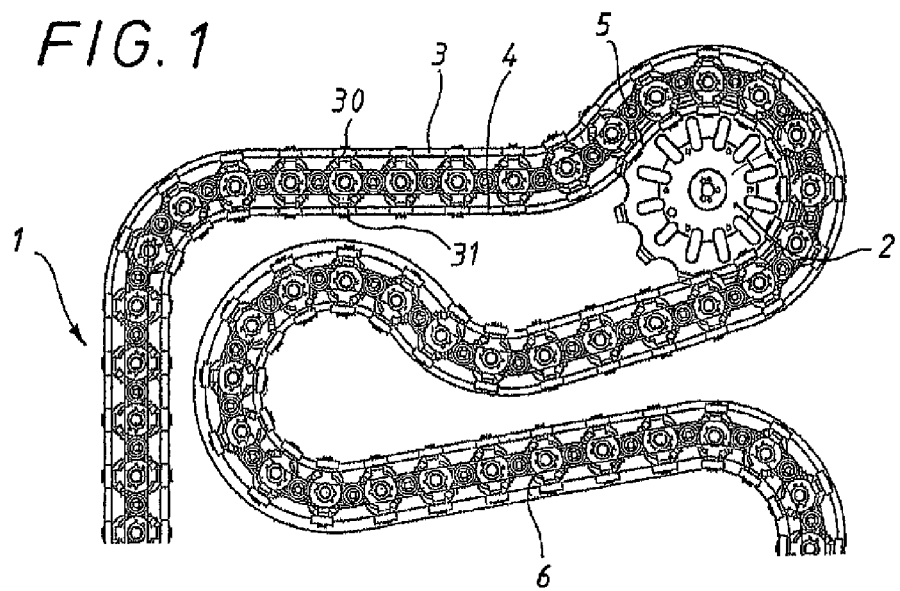
FIG. 1 is a schematic top plan view of part of a chain magazine in accordance with the invention.

FIG. 1 shows a schematic top plan view of a portion of the chain magazine according to an embodiment of the invention. Magazine chain 1 is guided meanderingly in the present embodiment to move on a supporting structure to which drive chain wheel 2 as well as deflection chain wheels (not shown) are mounted. Apart from that, two lateral guiding rails 3, 4 and central guiding rail 5 for the magazine chain are provided on the supporting structure as guiding devices. The magazine chain consists of a plurality of chain links 6 articulatedly connected to one another. The links may be made from a light metal or a dimensionally stable and wear-resistant plastic material by suitable die-casting or injection molding techniques.

Figure 2:
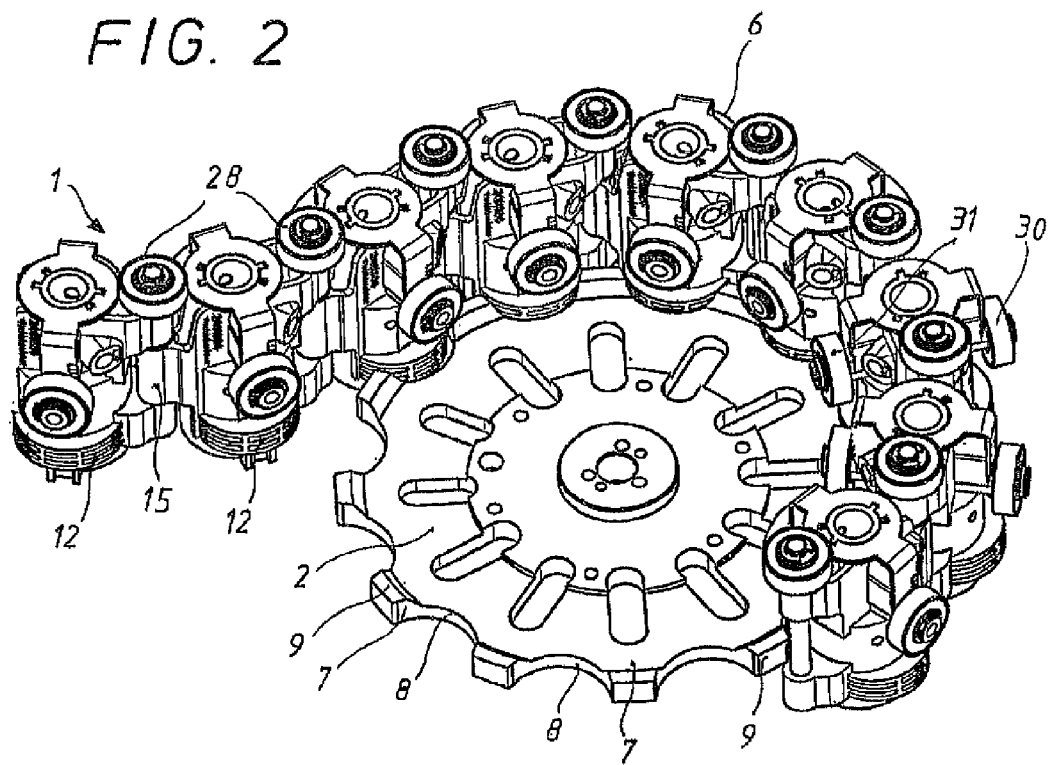
FIG. 2 is a perspective illustration of a part of the chain magazine of FIG. 1.

As can be taken from FIG. 2, drive chain wheel 2 has tooth-like lugs or teeth 7 on the outer rim thereof at a pitch determined by the size of the chain links. These tooth-like lugs are spaced apart in the circumferential direction by recesses 8 in the shape of a ring segment or arc. The lugs have thickened end parts 9 which serve to reduce the surface pressure when it acts on the corresponding circumferential areas of the chain links.

Figure 3:
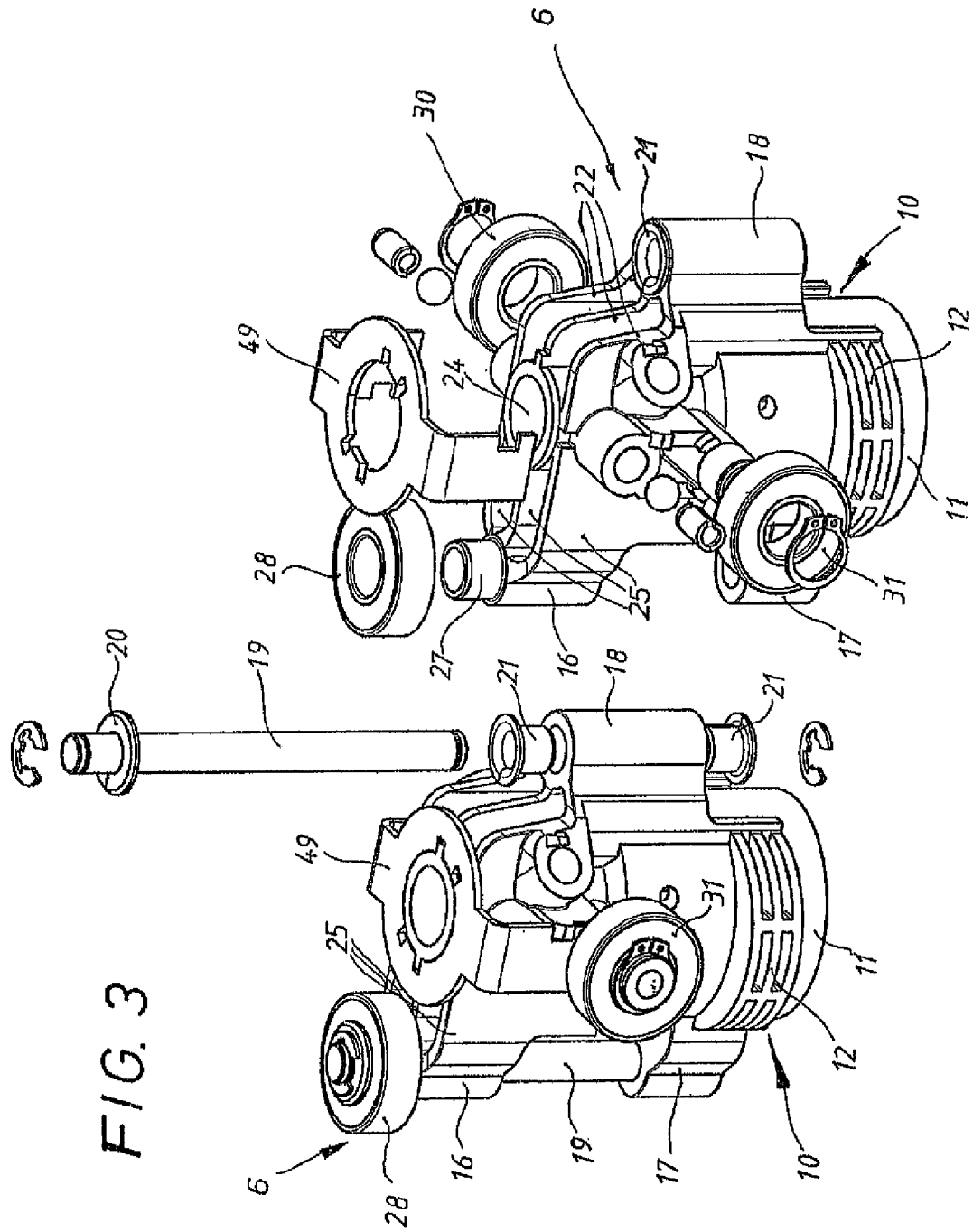
FIG. 3 is a perspective view of two successive chain links of the chain magazine of FIG. 2.

The magazine chain illustrated in FIGS. 1 and 2 is assembled so as to be articulate from chain links 6 of which two links are shown in FIG. 3 in an enlarged perspective and exploded illustration, respectively. Each chain link 6 is formed by a base or molded body 10 which, in this case, is integral and made from light metal die-cast or dimensionally stable plastic material and contains a socket for a tool on its inside. Base body 10 has an approximately partly cylindrical outer contour in its lower part 11. In a selected region of the lower part of base body 10, stiffening or reinforcing portions 12 are formed or molded on the exterior which, in the embodiment as shown, are formed as circumferential ribs or ring segments transversely connected to and disposed above one another. Teeth 7 of chain wheel 2, or correspondingly formed teeth of the deflection chain wheels, engage these reinforcing portions 12. In order to be able to guide magazine chain 1 meanderingly in the manner as shown in FIG. 1, two stiffening members 12 are respectively formed to be diametrically opposed in the form of two reinforcing portions having the shape of ring segments on each chain link 6. This facilitates and enables bendings as well as counter bendings of the chain path of travel because the respective chain wheels engage the reinforcing portion or stiffening member 12 formed on the one side or the other side of chain link 6. Neither the socket formed in base body 10 nor the base body itself have to be machined, which results in low manufacturing costs.

Two respectively successive chain links 6 are connected in a swiveling manner to each other by a respective joint 15 (FIG. 2) whose rotational axis is in the longitudinal center axis of the respective chain link. Each joint 15 is comprised of two eyes 16, 17 molded on a front face on base body 10 at a predetermined intermediate distance, a central rod eye 18 molded on the rear also of the base body, and a joint bolt 19, which is also referred to as a linchpin, to whose end retaining washers 20 are fixed. Bolt 19 protrudes through the aligned openings of front eyes 16, 17 as well as central rod eye 18 of the adjacent chain link. As can be taken from FIG. 3, two bearing bushes 21 are inserted in the bore of central rod eye 18 and serve to stiffen the ends of the control rod eye.

In the embodiment shown, molded central rod eye 18 has a cross-sectional shape that gradually widens toward the chain link center axis and is connected in its upper part to base body 10 of chain link 6 by three formed or molded longitudinal bars 22 extending essentially in the direction of movement. These bars 22 merge into the wall of vertical opening 24. On the diametrically opposed side of opening 24 three bars 25 extending in the direction of movement are also formed or molded which merge into the circumferential wall of upper rod eye 16, as shown in FIG. 3. These bars 22 and 25 oriented in the direction of movement of chain magazine 1 increase the dimensionally stability and load capacity of the chain links.

Hollow pin 27 is molded on the top surface of upper front-side rod eyes 16, on which pin running wheel 28 is supported as a guide member so as to be rotatable about the axis of joint bolt 19. As front and rear joint bolts 19 of each chain link 6 are positioned in the central longitudinal plane of the chain link, front and rear running rollers 28 and their rotational axes are also disposed in this longitudinal plane whereby constructive and functional symmetry is achieved.

Figure 4:
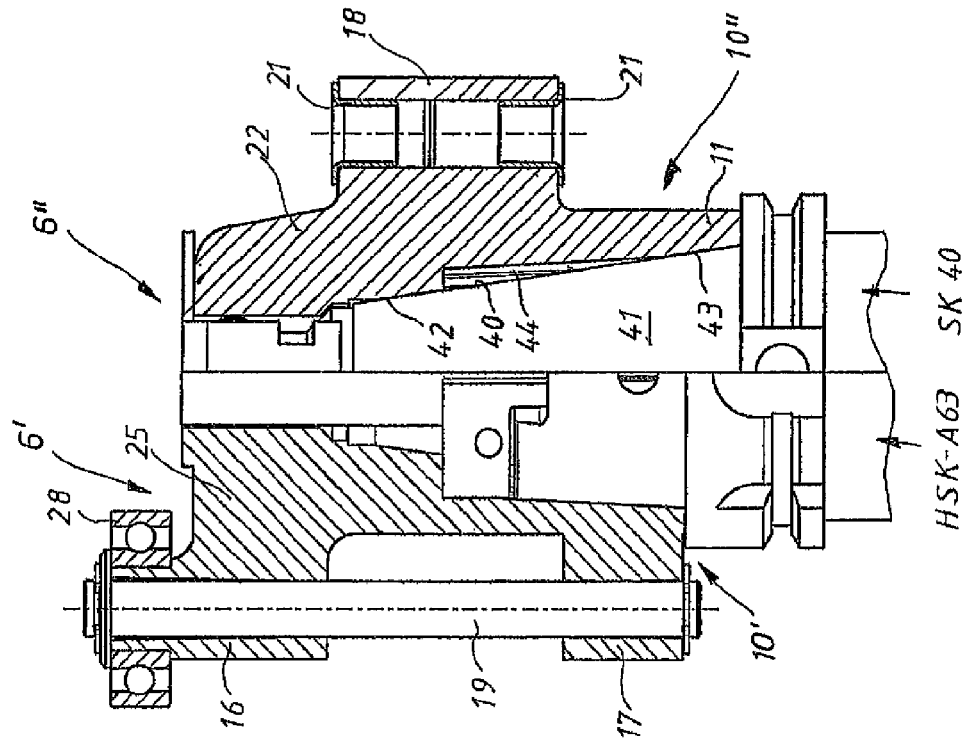
FIG. 4 is an axial sectional view of two different chain links for a magazine chain according to FIGS. 1 and 2 in a vertical plane transverse to the direction of movement.

In magazine chain 1 according to embodiments of the invention, lateral running roller pairs 30, 31, which are shown in the right-hand part of FIG. 3 and in FIG. 4 in detail, serve as lateral guiding members. As can be taken in particular from FIG. 4, base bodies 10 of chain links 6 have two lateral diametrically opposed hollow pins 33, 34 on the respective end parts of which is supported a running roller 30, 31 as a guiding member. As can be taken from FIG. 4, these running rollers 30, 31 move in guiding rails 3, 4 which, in the present case, are formed with a U-shaped cross-section.

Figure 5:
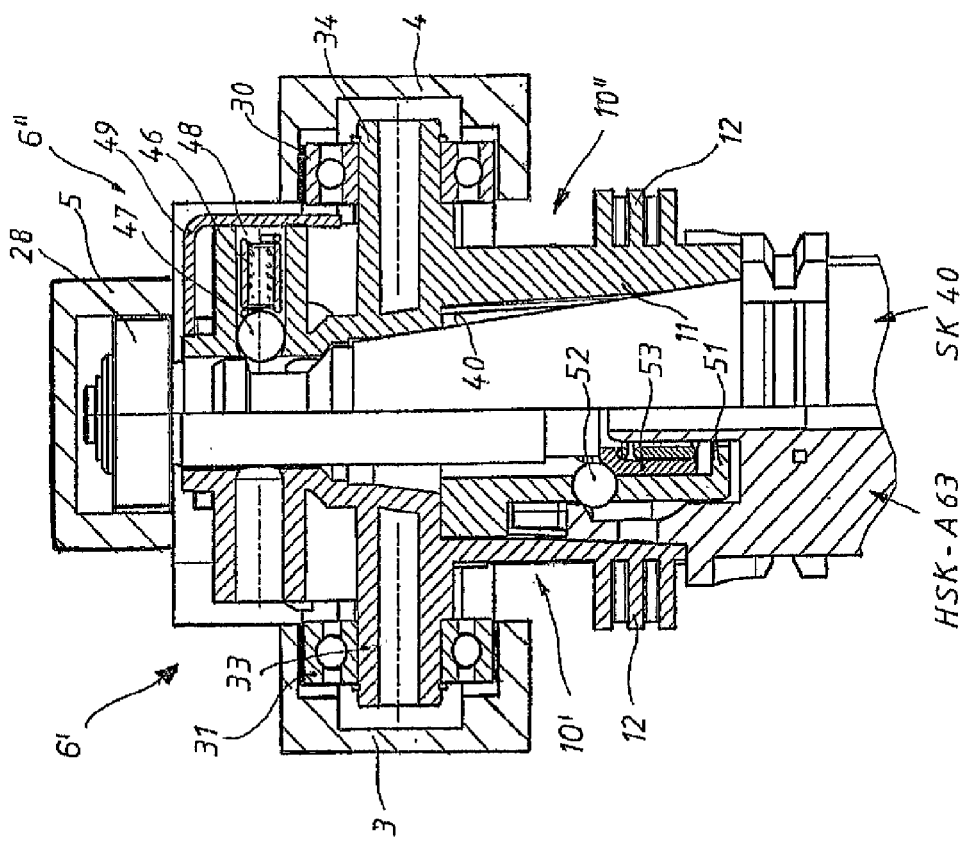
FIG. 5 shows the chain links of FIG. 4 in an axial section in the longitudinal direction of the chain magazine.
Figure 6:
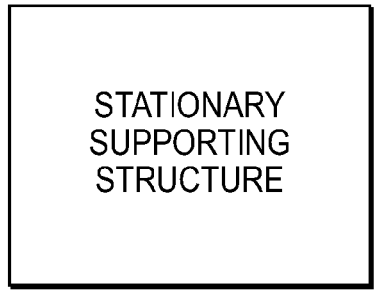
FIG. 6 schematically shows a stationary supporting structure.
Figure 7:
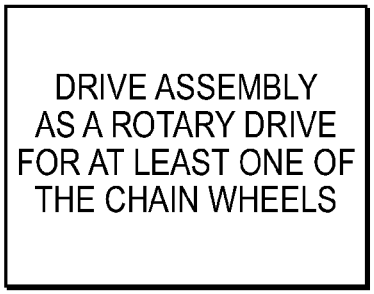
FIG. 7 schematically shows a drive assembly as a rotary drive for at least one of the chain wheels.

FIGS. 4, 5 show two respective different embodiments of a chain link 6', 6" for the magazine chain according to the invention. The embodiment 6" shown in the respective right-hand half of FIGS. 4 and 5 has been conceived for the use of tool holding fixtures of the SK 40 type and embodiment 6' shown in the left-hand half of these figures has been conceived for the use of tool holding fixtures of the HSK-A63 type. Accordingly, base body 10" of the respective right-hand side chain link 6" has interior 40 the diameter of which decreases upwardly in the vertical direction, in which tool taper 41 is accommodated that is supported without play on an upper and lower circular area 42, 43. In interior 40, further inclined struts 44 may be molded, on whose inclined inner surface tool taper 41 abuts as well. In order to secure the tool taper, a ball-type lock-up mechanism is used that is shown in FIG. 4 and consists of compression spring 46 and ball 47 that is loaded radially inward by the former, which ball 47 is disposed in transverse bore 48 in the upper part of the clamping link and secured against falling out by torque control spring 49.

Chain link 6' illustrated in the respective left-hand part of FIGS. 4 and 5 has a shortened lower end part, that is, it ends directly below ring segment-shaped stiffening members 12. In order to fix an inserted tool holding fixture HSK-A63, clamping bush 51, comprising ball 52 and spring clip 53, is used. This securing mechanism is known in the stated tool holding fixtures. Even in the embodiments illustrated in FIGS. 4 and 5, chain links 6', 6", including base bodies 10', 10" that contain the sockets, consist of light metal cast or dimensionally stable plastic material which leads to a low total weight of the magazine chain. As it is not necessary to machine base bodies 10', 10" and thus the functional surfaces of the sockets, these embodiments can also be manufactured at low cost and are low-noise when being operated.

The invention is not limited to the embodiments as shown. While the base bodies of the chain links should preferably be formed integrally as light-weight casting or molding parts, a multi-part method of construction is also possible in which the individual components are permanently and solidly connected to one another by suitable connecting systems, such as soldering, welding, and gluing.

What is claimed is:

1. A tool chain magazine for program-controlled milling machines or program-controlled machining centers, the tool chain magazine comprising guiding devices, chain wheels, a drive assembly as a rotary drive for at least one of the chain wheels, and a stationary supporting structure to which the guiding devices, the chain wheels, and the drive assembly as the rotary drive for the at least one of the chain wheels are mounted, the tool chain magazine further comprising:

an endless magazine chain including a series of chain links connected in an articulated manner to one another, each chain link being held and guided on the guiding devices by guiding members;

each chain link having a base body with a respective socket therein for receiving and holding a respective tool, wherein the sockets are each disposed centrally with respect to the respective base body; and each chain link is formed with a front and a rear connecting joint, each front connecting joint being located at a diametrically opposite location of the respective chain link as the respective rear connecting joint, each said front connecting joint and each said rear connecting joint including a molded rod eye, said connecting joints being arranged on a longitudinal center axis of the magazine chain;

each base body being made of a metal or plastic material, each base body including a respective one of the sockets and including a respective molded rod eye of said front connecting joint and a respective molded rod eye of said rear connecting joint;

each socket having a respective longitudinal center axis, and each base body including reinforcing portions in the form of ribs or ring segments, the ribs or ring segments connected to each other and disposed circumferentially of the respective socket, one of the ribs or ring segments above another of the ribs or ring segments, respectively, in the axial direction of the respective socket longitudinal center axis, the reinforcing portions being engaged by the chain wheels as the magazine chain is fed via actuation of the rotary drive.

2. The tool chain magazine according to claim 1, wherein the guiding members are guiding and support rollers, and wherein each chain link has two diametrically opposite ones of the guiding and supporting rollers that move in parallel ones of the guiding devices.

3. The tool chain magazine according to claim 2, wherein the guiding and supporting rollers are supported on pins molded on the base body of the respective chain link.

4. The tool chain magazine according to claim 3, wherein each chain link has reinforcing struts in an end part thereof that extend in a direction of a path of travel along which the magazine chain is moved when the rotary drive is actuated.

5. The tool chain magazine according to claim 3, wherein each respective molded rod eye of the respective front connecting joint is spaced apart from an additional molded rod eye of the respective front connecting joint, such that the two spaced-apart rod eyes of the front connecting joint are molded on a front face of the respective chain link and the respective molded rod eye of the respective rear connecting joint is molded on a diametrically opposed rear face of the respective chain link, and wherein a length of the respective molded rod eye of the rear face is smaller than the distance between the two rod eyes of the front face.

6. The tool chain magazine according to claim 3, wherein a respective transverse bore, transverse with respect to the longitudinal axis of the respective socket, is formed in an end part of each of the base bodies of each of the chain links, where a respective fixation ball and a respective compression spring are arranged for fixing a respective tool taper inserted in the respective socket.

7. The tool chain magazine according to claim 2, wherein each of the front connecting joints is connected to a respective one of the rear connecting joints by a respective joint bolt, and wherein a respective guiding roller is supported on a respective end part of each of the respective joint bolts the guiding devices having guiding rails, and the guiding rollers move along the guiding rails.

8. The tool chain magazine according to claim 2, wherein each chain link has reinforcing struts in an end part thereof that extend in a direction of a path of travel along which the magazine chain is moved when the rotary drive is actuated.

9. The tool chain magazine according to claim 2, wherein each respective molded rod eye of the respective front connecting joint is spaced apart from an additional molded rod eye of the respective front connecting joint, such that the two spaced-apart rod eyes of the front connecting joint are molded on a front face of the respective chain link and the respective molded rod eye of the respective rear connecting joint is molded on a diametrically opposed rear face of the respective chain link, and wherein a length of the respective molded rod eye of the rear face is smaller than the distance between the two rod eyes of the front face.

10. The tool chain magazine according to claim 2, wherein a respective transverse bore, transverse with respect to the longitudinal axis of the respective socket, is formed in an end part of each of the base bodies of each of the chain links, where a respective fixation ball and a respective compression spring are arranged for fixing a respective tool taper inserted in the respective socket.

11. The tool chain magazine according to claim 1, wherein each chain link has reinforcing struts in an end part thereof that extend in a direction of a path of travel along which the magazine chain is moved when the rotary drive is actuated.

12. The tool chain magazine according to claim 1, wherein each respective molded rod eye of the respective front connecting joint is spaced apart from an additional molded rod eye of the respective front connecting joint, such that the two spaced-apart rod eyes of the front connecting joint are molded on a front face of the respective chain link and the respective molded rod eye of the respective rear connecting joint is molded on a diametrically opposed rear face of the respective chain link, and wherein a length of the respective molded rod eye of the rear face is smaller than the distance between the two rod eyes of the front face.

13. The tool chain magazine according to claim 1, wherein a respective transverse bore, transverse with respect to the longitudinal axis of the respective socket, is formed in an end part of each of the base bodies of each of the chain links, where a respective fixation ball and a respective compression spring are arranged for fixing a respective tool taper inserted in the respective socket.

14. The tool chain magazine according to claim 13, wherein a respective torque control spring is clamped onto the respective end part of the respective base body of the respective chain link to secure the respective compression spring.

15. The tool chain magazine according to claim 1, wherein the metal or plastic base bodies are cast or molded, respectively.

16. A tool chain magazine for program-controlled milling machines or program-controlled machining centers, the tool chain magazine comprising guiding devices, chain wheels, a drive assembly as a rotary drive for at least one of the chain wheels, and a stationary supporting structure to which the guiding devices, the chain wheels, and the drive assembly as the rotary drive for the at least one of the chain wheels are mounted, the tool chain magazine further comprising:

an endless magazine chain including a series of chain links connected in an articulated manner to one another, each chain link being held and guided on the guiding devices by guiding members;

each chain link having a base body with a respective socket therein for receiving and holding a respective tool, wherein the sockets are each disposed centrally with respect to the respective base body; and each chain link is formed with a front and a rear connecting joint, each front connecting joint being located at a diametrically opposite location of the respective chain link as the respective rear connecting joint, each said front connecting joint and each said rear connecting joint including a molded rod eye, said connecting joints being arranged on a longitudinal center axis of the magazine chain;

each base body being made of a metal or plastic material, each base body including a respective one of the sockets and including a respective molded rod eye of said front connecting joint and a respective molded rod eye of said rear connecting joint;

each base body including at least one reinforcing portion, each base body, each socket, each front molded rod eye, each rear molded rod eye, and each at least one reinforcing portion of each respective chain link, all being formed in an integrally-molded single piece, and wherein the at least one reinforcing portion is engaged by the chain wheels as the magazine chain is fed via actuation of the rotary drive.

* * * * *